United States Patent [19]

Mansukhani et al.

[11] Patent Number: 4,724,151
[45] Date of Patent: Feb. 9, 1988

[54] CHEWING GUM COMPOSITIONS HAVING PROLONGED BREATH-FRESHENING

[75] Inventors: Gul Mansukhani, Staten Island, N.Y.; Subraman R. Cherukuri, Towaco, N.J.

[73] Assignee: Warner-Lambert Company, Morris Plains, N.J.

[21] Appl. No.: 922,590

[22] Filed: Oct. 24, 1986

[51] Int. Cl.⁴ ............................................. A23G 3/30
[52] U.S. Cl. ..................................... 426/3; 426/651; 426/533; 426/660; 424/48
[58] Field of Search ................... 426/3, 533, 650, 651, 426/660; 424/48

[56] References Cited

U.S. PATENT DOCUMENTS

| | | | |
|---|---|---|---|
| 3,795,744 | 3/1974 | Ogawa et al. | 426/3 |
| 4,001,438 | 1/1977 | Marmo et al. | 426/3 |
| 4,045,581 | 8/1977 | Mackay et al. | 426/3 |
| 4,157,384 | 6/1979 | Watson | 424/48 |
| 4,208,431 | 6/1980 | Frillo et al. | 426/3 |
| 4,271,198 | 6/1981 | Cherukuri et al. | 426/3 |
| 4,296,093 | 10/1981 | Rowsell | 424/48 |
| 4,485,118 | 11/1984 | Carroll et al. | 426/3 |

Primary Examiner—Jeanette Hunter
Attorney, Agent, or Firm—Daniel A. Scola, Jr.; Gary M. Nath

[57] ABSTRACT

A mint-flavored chewing gum composition having enhanced breath-freshening effects comprising a gum base, a sweetener and a flavor composition comprising a blend of (a) a liquid flavor oil selected from the group consisting of spearmint oil, peppermint oil and mixtures thereof, wherein the flavor oil has a menthol content of about 15% to about 45% by weight of said flavor oil;

(b) a spray-dried flavor oil selected from the group consisting of peppermint oil, spearmint oil and mixtures thereof; and (c) spray-dried menthol present in amounts of about 0.2% to about 1.0% by weight of the total chewing gum composition.

9 Claims, 2 Drawing Figures

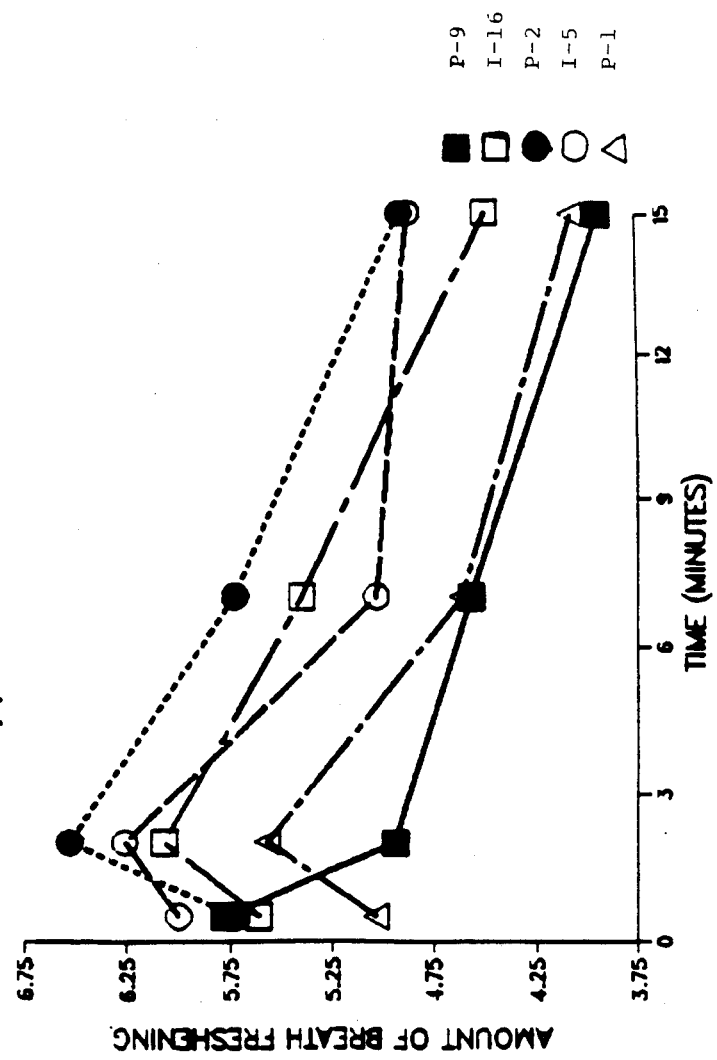

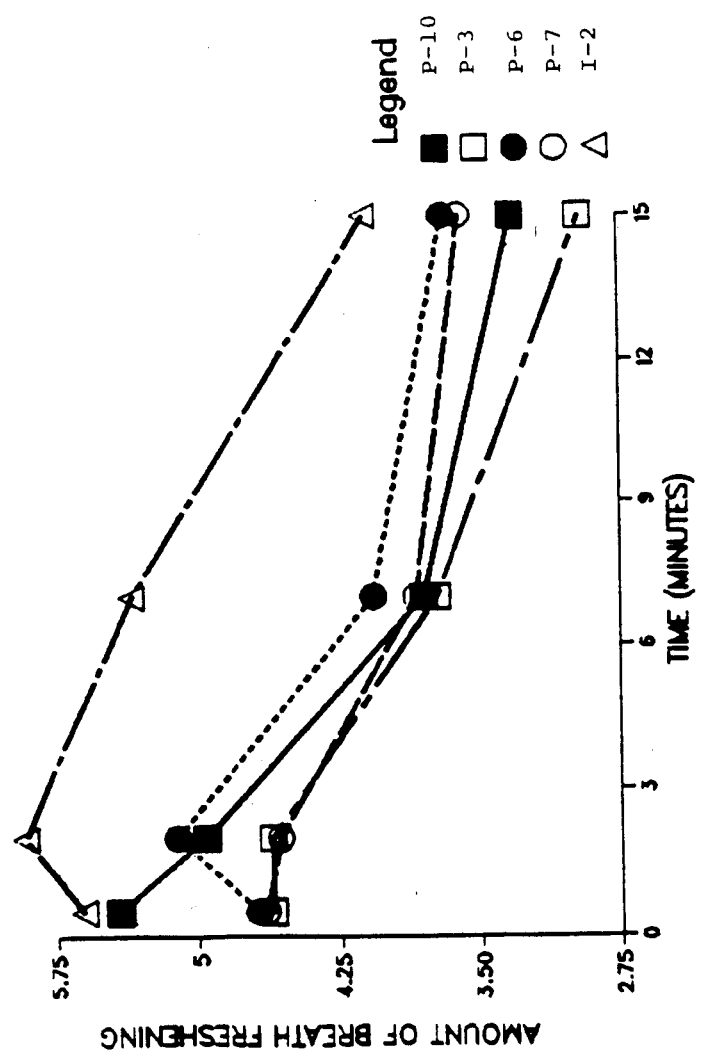

CHEWING GUM COMPOSITIONS HAVING PROLONGED BREATH-FRESHENING

This invention relates to mint chewing gum compositions having a unique flavor combination which gives the user a significantly enhanced perception of breath-freshing.

When chewed for even a short period of time, these compositions leave the user with a significantly enhanced sensation and perception of freshness and coolness in their breath. More particularly this invention relates to chewing gum compositions which contain a unique mint flavor composition comprising a blend of mint flavor oils containing a specified amount of menthol, a mint spray-dried flavor oil, and spray-dried menthol, all of which are incorporated as a blended mixture into the final chewing gum composition.

It is well recognized that one of the purposes of chewing gum is to enhance one's breath and provide a clean or fresh feeling in the mouth. Most chewing gums can provide at least marginal enhancement of the breath for the first few minutes while the flavor is the most intense.

Heretofore, chewing gums have not been able to deliver to the user sufficient flavor such that there is a perceived breath-freshing effect which is sustained over a period of time. In some instances, the incorporation of greater than normal amounts of mint flavor have been attempted to induce the breath-freshing effect, but harsh and bitter tones result. Harsh tones, of course, are unacceptable to the consumer, who requires an organoleptically pleasing taste. Larger amounts of flavor is also a disadvantage in that the oils tend to plasticize the gum base, thereby altering the texture and consistency of the chewing gum. In non-stick chewing gum compositions, flavor plasticization of the gum base can defeat the non-stick character, rendering the gum unacceptable to denture and prosthesis wearers. For these reasons, the simple addition of higher levels of mint flavor will not provide a satisfactory chewing gum having enhanced breath-freshening.

Numerous patents have discussed the combination of flavor oils and flavor powders to increase flavor impact and extend the taste over a prolonged period of time. Such techniques as encapsulation of flavors and sweeteners to provide timed release are commonly used to achieve prolonged effects and sequential delivery of the flavor or sweetener. These patents, however, have failed to address the concept of breath-freshening.

Those patents which do address the concept of breath-freshening appear to focus on the incorporation of an additive which serves as a deoderizer. For example, U.S. Pat. No. 2,525,072 discloses chewing gums containing inorganic silicone and magnesium powders which serve as absorbents of malodor. U.S. Pat. No. 2,922,747 discloses the use of chloraphyll, vegetable oils (lipids) and lecithin as effective deoderants in tablets and chewing gum compositions. The lipids, in the form of a 20% oil-in-water emulsion, are mixed with the chlorophyll and coating syrup and applied to the gum center.

Canadian Pat. No. 989,738 discloses a wafer containing cetylidimethylbenzylammonium chloride and peppermint oil as a means for providing residual breath-sweetening in the mouth.

U.S. Pat. No. 4,112,066 discloses breath-freshening compositions containing calcium and magnesium carbonate in combination with copper gluconate in a mint flavored tablet.

French Demande 2,127,005 discloses reodorizing compositions containing 10-2000 ppm alpha-ionone, alpha-methylionone, citral or geranyl formate as a means of masking odors.

None of the aforementioned patents disclose the three required components of the instant invention, which are shown herein to be critical to the perception of breath-freshening by the user.

Additionally, it is well known that maloder is a concern of many denture wearers. Thus, a need exists for the effective delivery of a breath-freshening effect through a chewing gum composition which has non-stick characteristics. The instant invention is preferably incorporated into a non-stick formulation for this purpose.

Various efforts have been made to modify the well known gum base and chewing gum formulations to give them non-stick characteristics, by either the deletion of certain common ingredients or the inclusion of other ingredients, in each case requiring adjustment of the gum base to assure the maintenance of desired gum characteristics.

One of the first formulations is described by Barker in U.S. Pat. No. 2,076,112. The Barker patent discloses that chewing gum containing talc does not stick to the teeth or to the interior of the person's mouth. In British Pat. No. 1,025,958 to Wm. Wrigley Company a nonadhesive chewing gum is disclosed. The chewing gum is shown to use pure tannic acid to produce chewing gum which will not adhere to acrylic surfaces in the mouth.

In U.S. Pat. No. 3,984,574 to Comollo a non-tack chewing gum is disclosed which contains as the preferred elastomer a low molecular weight polyisobutylene (molecular weight of 6,000 to 12,000) and/or a higher molecular weight polyisobutylene (molecular weight of 40,000 to 120,000). It is also disclosed that other elastomers may be employed in place or or together with the polyisobutylene, namely, polyisoprene, a copolymer of isobutylene and isoprene. or the copolymer of butadiene and styrene. Comollo indicates in Column 7 beginning at line 7 that it was discovered that combination of natural gums, natural resins, rosin derivatives and resins of waxes of petroleum origin, natural gums, natural or synthetic rubbers, and resins, and natural gums, natural or synthetic rubbers and waxes, or combination of rubbers, waxes and resins produce inherently tacky chewing gum bases and such combinations should be avoided. In addition to the referenced elastomers, the Comollo chewing gum contains hydrogenated vegetable oils or animal fats, polyvinyl acetate having a molecular weight of at least 2,000, and fatty acids, such as stearic and palmitic acid. and mono and diglycerides of fatty acids. The Comollo reference teaches the essential presence of mineral adjuvants, such as calcium carbonate talc or tricalcium phosphate. This disclosure is consistent with the earlier prior art disclosing the essential presence of mineral fillers as one of the ingredients to obtain non-stick properties in chewing gum.

U.S. Pat. No. 3,974,293 to Witzel discloses a non-adhesive chewing gum which contains titanium dioxide, various detackifying agents, viscosity modifying agent and wetting agents. The reference employs high amounts of fillers, namely 8 to 50% by weight of the gum base. Exemplary fillers include calcium carbonate and talc.

U.S. Pat. No. 4,357,355 to Koch et al is likewise directed to a non-stick bubble gum base composition that can contain non-SBR elastomers. In particular, this patented non-adhesive bubble gum base composition includes a high molecular weight vinyl polymer such as polyvinyl acetate or polyvinyl alcohol, together with an emulsifier, in combination with ingredients such as an elastomer, an oleaginous plasticizer, an elastomer solvent, mineral adjuvants, fatty acids, and others. The polyvinyl acetate employed by Koch et al has an average molecular weight of about 38,000 to about 94,000 which material is preblended with the gum base elastomers prior to incorporation of the remaining base ingredients. Koch et al specifically disclose the presence of 5 to 25% by weight of mineral adjuvants, such as calcium carbonate and talc.

U.S. Pat. No. 4,387,1908 to Koch et al is directed to a non-stick chewing gum composition which contains the following ingredients:

| Elastomer | 8–30% |
| --- | --- |
| Oleaginous Plasticizer | 9–40% |
| Mineral Adjuvants | 10–15% |
| Non-Toxic Vinyl Polymer | 16–32% |
| Emulsifier | 0.5–10% |
| Elastomer Solvent | 2.5–13% |

The vinyl polymer of Koch et al may have a molecular weight of from 3,000 to about 94,000 and includes molecular weights on the order of 10,000 to 40,000 as well as 50,000 to 75,000.

In accordance with a preferred embodiment of the present invention a chewing gum composition has been discovered which not only alleviates the adhesion properties of conventional formulations but also aids in initial and long lasting flavor impact and perceived breath freshening power without higher levels of flavor oils. Breath freshening power and non-stick characteristics are features that make a chewing gum product appealing to denture wearers because of denture breath, that is, halatosis, which is associated with denture wearers due to food retained between the palate and the denture.

The instant invention concerns a mint flavored chewing gum composition capable of providing improved breath-freshening perception comprising a gum base, a sweetener and a flavor composition comprising a blend of:
  (a) a liquid flavor oil selected from the group consisting of spearmint oil, peppermint oil and mixtures thereof, wherein the flavor oil has a menthol content of about 27% to about 36% by weight of said flavor oil;
  (b) a spray-dried flavor oil selected from the group consisting of peppermint oil and spearmint oil and mixtures thereof; and
  (c) spray-dried menthol present in amounts of about 0.2 to about 0.75% by weight of the chewing gum composition.

This invention is focused on mint-flavored gums, i.e., peppermint, spearmint and combinations thereof, because of their association with cooling sensations in the mouth and their ability to be combined with menthol to produce a sustained cooling sensation and fresh impact.

Sensory evaluation tests have determined that the consumer has a keen awareness of the breath-freshening and cooling effect of gum during and after chewing. It has been discovered, through the aid of large scale consumer sensory evaluation tests, that each of the above components in their recited amounts are critical to achieving a degree of enhanced breath-freshening perception which is significantly better, i.e., more apparent to the consumer, than commercially available prior art mint gums. That all three components of the flavor composition were needed was indeed surprising, since the art has disclosed the use of mint flavors and menthol in chewing gum for many years. The combination of liquid flavors and powdered flavors has also been discussed in numerous patents. Yet, nowhere has there been a suggestion that the above combination would be necessary to achieve breath-freshening. The numerous sensory evaluation data indicate that omission of one or more of the above-recited components results in a chewing gum which fails to give the perception of breath-freshening.

The Liquid Flavor Component

The liquid peppermint and spearmint flavor oils are useful in amounts of about 0.2% to about 2% by weight of the total chewing gum composition, preferably about 0.5% to about 1.5%, and most preferably about 0.75% to about 0.9%. It was believed that to avoid the deleterious effects of adding abnormally high amounts of flavor, these conventional flavor ranges would be required. The liquid flavor oil must contain or have admixed thereto a menthol content of about 15% to about 45% and preferably from about 27% to about 36% by weight of the total flavor oil. It has been determined, as clearly indicated by the sensory evaluation tests, that in the absence of the menthol contained within the liquid flavor, breath-freshening perception either was totally absent, unperceptable or significantly reduced. This is true even though all other components were present. Peppermint flavor is known to inherently contain this amount of menthol. Spearmint flavor, however, does not normally contain menthol and as such requires the addition of menthol to the liquid flavor oil prior to the blending of the rest of the flavor composition ingredients. In this case, crystalline menthol is blended with the liquid spearmint oil prior to incorporation of flavor components into the chewing gum composition, Examples of types of useful commercially available peppermint oils are mid-west peppermint oil, willanette peppermint oil, madras peppermint oil and arvensis peppermint oil, among others. Blends of peppermint oils are of course useful. Examples of types of spearmint oils commercially available are far-west spearmint oil, mid-west spearmint oil, far-west scotch and mid-west scotch spearmint oil, among others.

The Spray-Dried Flavor Component

The second required component of the flavor composition is the spray-dried mint flavor, present in amounts of about 0.2% to about 2.0% by weight of the total chewing gum composition and preferably about 0.4% to about 0.6%. Spray-dried flavor oil is readily commercially available from a number of sources. Examples of commercially available spray-dried peppermint oil are naefco, lofuran and natural seal peppermint oil. One known type of commercially available spray-dried spearmint oil is natural seal spray-dried spearmint. Spray-drying of the mint oils can be accomplished by conventional spray-drying techniques whereby a carrier solution or mixture containing the flavor oil is fed through a pressure nozzle and atomized. Generally, the spray-dried flavor is present in the carrier mixture in amounts of about 15 to about 20% by weight of the total mixture, i.e., carrier and flavor. In the case of spray-dried mint flavors which are to be used in sugar-containing chewing gum compositions, the carrier solution is generally a sucrose solution. In sugarless formulations. the carrier solution is most often an aqueous gum arabic solution.

The Spray-Dried Menthol Component

The final required flavor composition component is spray-dried menthol, present in amounts of about 0.2% to about 1.0% by weight of the total chewing gum composition and preferably in amounts of about 0.4% to about 0.5%.

While the precise reason why these flavor components give a perceived breath-freshening effect is not entirely understood, it is known that each component appears to play a vital role. The presence of only one or two of the components will not provide the desired results and as such would not be considered part of the invention. Menthol when added to the liquid flavor appears to ameliorate bitter or harsh tones, often inherent in peppermint and spearmint flavors, and boosts the flavor perception. Amounts outside the inventive ranges. however, have the reverse effect, i.e., bitterness occurs along with a distortion in flavor. Spray-dried liquid flavor provides taste without plasticization of the gum base and enhances the perception of flavor release. The separate addition of spray-dried menthol contributes to the cooling effect in the mouth without interfering with the mint flavor. The net result is a mint flavored chewing gum composition which has a breath-freshening effect on the mouth.

Chewing gum formulations in which the novel flavor compositions may be employed, will vary greatly depending on various factors such as the type of base used, consistency desired and other components used to make the final product. In general, useful amounts of gum base vary from about 5% to about 45% by weight of the final chewing gum composition, with preferred amounts being about 15% to about 30% by weight and most preferably about 15% to about 25%. The gum base may be any water-insoluble gum base well known in the art, providing it allows for adequate release of the three components such that breath-freshening is perceived. Illustrative examples of suitable polymers in gum bases include both natural and synthetic elastomers and rubbers. For example, those polymers which are suitable in gum bases, include, without limitation, substances of vegetable origin such as chicle. jelutong, gutta percha and crown gum. Synthetic elastomers such as butadiene-styrene copolymers, isobutylene-isoprene copolymers, polyethylene, polyisobutylene and polyvinyl-acetate and mixtures thereof, are particularly useful.

The instant invention is especially useful in gum bases which can be formulated into non-stick chewing gum compositions. This is in part due to the desire for breath-freshening by those wearing dentures or partials.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin and partially hydrogenated wood rosin, pentaerythritol ester of wood rosin, glycerol ester of wood rosin, glycerol ester of partially dimerized rosin, glycerol ester of polymerized rosin, glycerol ester of tall oil rosin, glycerol ester of wood rosin and partially hydrogenated wood rosin and the partially hydrogenated methyl ester of rosin, such as polymers of alpha-pinene or beta-pinene, terpene resins including polyterpene and mixtures thereof. The solvent may be employed in an amount ranging from about 10% to about 75% and preferably about 45% to about 70% by weight to the gum base.

A variety of traditional ingredients such as plasticizers or softeners such as lanolin, stearic acid, sodium stearate, potassium stearate, glyceryl triacetate, glycerine and the like, for example, natural waxes, petroleum waxes such as polyurethene waxes, paraffin waxes and microcrystalline waxes may also be incorporated into the gum base to obtain a variety of desirable textures and consistency properties. These individual additional materials are generally employed in amounts of up to about 30% by weight and preferably in amounts of from about 3% to about 20% by weight of the final gum base composition.

The chewing gum composition may also include the cbnventional additives such as flavoring agents; coloring agents such as titanium dioxide; emulsifiers such as lecithin and glyceryl monostearate; and additional fillers such as aluminum hydroxide, alumina, aluminum silicates, calcium carbonate, and talc. Combinations of these conventional additives are contemplated. These fillers may also be used in the gum base in various amounts. Preferably the amount of fillers when used will vary from about 4% to about 30% by weight of the final chewing gum.

The present invention contemplates the inclusion of those sweeteners well known in the art, including both natural and artificial sweeteners. Thus, sweeteners may be chosen from the following non-limiting list: sugars such as sucrose, glucose (corn syrup), dextrose, invert sugar, fructose, and mixtures thereof; saccharine and its various salts such as the sodium or calcium salt; cyclamic acid and its various salts such as the sodium salt (cyclamates); the dipeptide sweeteners such as aspartame; natural sweeteners such as dihydrochalcone; glycyrrhizin; *Stevia rebaudiana* (Stevioside); and sugar alcohols such as sorbitol, sorbitol syrup, mannitol, xylitol, and the like. Also contemplated as a sweetener is the nonfermentable sugar substitute hydrogenated starch hydrolysate (lycasin) which is described in U.S. Pat. No. Re. 26,959. Also contemplated is the synthetic sweetener 3,6-dihydro-6-methyl-1-1,2,3-oxathiazin-4-one-2,2-dioxide particularly the potassium (Acesulfame-K), sodium and calcium salts thereof as described in German Pat. No. 2,001,017.7.

The colorants useful in the present invention, include the pigments such as titanium dioxide, and may be incorporated in amounts of up to about 1% by weight, and preferably up to about 6% by weight. Colorants may also include dyes suitable for food, drug and cosmetic applications. These colorants are known as F.D.&C. dyes. The materials acceptable for the foregoing spectrum of use are preferably water-soluble. Illustrative examples include indigo dye, known as F.D.&C. Blue No. 2, which is the disodium salt of 5,5'-indigotin-di-sulfonic acid. Similarly, the dye known as F.D.&C. Green No. 1, comprises a triphenylmethane dye and is the monosodium salt of the 4-[4-Nethyl-p-sulfobenzylamino) diphenylmethylene] [1-(N-ethyl-N-P-sulfobenzyl)-2,5-cyclohexadienimini]. A full recitation of F.D.&C. and D.&C. colorants and their corresponding chemical structures may be found in the Kirk-Othmer Encyclopedia of Chemical Technology, in Volume 5, at pages 857–884.

The flavor compositions of the instant invention may also be used in conventional soft and hard confections. The preparation of soft confections, such as nougat, involves conventional methods, such as the combination of two primary components, namely (1) a high boiling syrup such as corn syrup or the like and (2) a relatively light textured frappe, generally prepared from gelatin, egg albumen, milk proteins such as casein and vegetable proteins such as soy protein, and the like. The frappe is generally relatively light, and may, for example, range in density from about 0.5 to about 0.7.

The high boiled syrup of the soft confectionery is relatively viscous and possesses a higher density, and frequently contains a substantial amount of sugar. Conventionally, the final nougat composition is prepared by the addition of a high boiled syrup to the frappe under agitation, to form the basic nougat mixture. Further ingredients such as flavoring, additional sugar, colorants, preservatives, medicaments, mixtures thereof and the like may be added thereafter also under agitation. general discussion of the composition and preparation of nougat confections may be found in B. W. Minifie, *Chocolate, Cocoa and Confectionery Science and Technology*, 2nd edition, AVI Publishing Co, Inc., Westport, Conn. (1980), at pages 424–425.

The procedure for preparing the "soft" confectionery involves known procedures. In general, the frappe component is prepared first and thereafter the syrup component is slowly added under agitation at a temperature of at least 65° C., and preferably at least 100° C. The mixing of components is continued to form a uniform mixture, after which the mixture is cooled to a temperature below 80° C., at which point the flavor may be added. The mixture is further mixed for an additional period until it is ready to be removed and formed into suitable confectionery shapes.

Similar to the soft confectionery, hard confectionery may be utilized in this invention. Likewise, it may be processed and formulated by conventional means. In general, a hard confectionery has a base composed of a mixture of cane or beet sugar, polyhydric alcohols and glucose syrup, low moisture levels, e.g., from 0.5 to 1.5% and are present in the final confectionery in amounts of between about 5% and about 99% by weight of the final composition. Such confectionery may be routinely prepared by conventional methods, such as those involving fire cookers, vacuum cookers and scraped-surface cookers also referred to as high speed atmospheric cookers.

Fire cookers involving the traditional method of making candy base, may be used. In this method the desired quantity of sugar is dissolved in water by heating in a kettle until the sugar dissolves. Corn syrup or an invert sugar is then added and cooking continued until a final temperature of 145° to 165° C. is achieved. The batch is then cooled and worked as a plastic-like mass to incorporate additives.

A high-speed atmospheric cooker uses a heat-exchange surface. Processes using it involve spreading a film of candy on a heat exchange surface, and heating the candy to 165° to 170° C. in a few minutes. The candy is then rapidly cooked to 100° to 120° C. and worked as a plastic-like mass enabling incorporation or the additives, such as flavor, color, acidulents and medicaments. It is at this point that the inventive flavor compositions are blended into the candy.

In vacuum cookers, the sugar and corn syrup are boiled to 125° to 132° C. and vacuum applied and additional water is boiled off without extra heating. When cooking is complete, the mass is a semi-solid, having a plastic-like consistency. At this point, color, flavors and other additives are mixed in the mass by routine mechanical mixing operations.

The optimum mixing required to uniformly mix the flavor, color and other additives during conventional manufacturing of hard confectionery is determined by the time needed to obtain a uniform distribution of the materials. Normally, mixing times of 4 to 10 minutes have been found acceptable.

Once the candy mass has been properly tempered, it may be cut into workable portions or formed into desired shapes. A general discussion of the composition are preparation of hard confections may be found in H. A. Lieberman, *Pharmaceutical Dosage Forms: Tablets Vol* 1 (1980), Marcel Dekker, Inc. at pages 339 to 469.

It should be mentioned that the apparati useful in accordance with the present invention comprises those cooking and mixing apparati well known in the confectionery manufacturing arts, and therefore the selection of a specific apparatus will be apparent to the artisan.

The confectioneries useful in conjunction with the flavor compositions of this invention include, but are not limited to, sugarless boiled candy, lozenges, pressed tablets, toffee and nougat, gels, mints, syrups, liquids, elixirs and the like.

The present invention includes a method for preparing a chewing gum composition, including both chewing gum and bubble gum formulations. The gum base is conventionally melted at temperatures that may range from about 60° to about 120° C. for a period of time sufficient to render the base molten. For example, the gum base may be heated under these conditions for a period of about thirty minutes just prior to mixing with the remaining ingredients of the gum composition.

The order of addition of the remaining ingredients is not critical. A preferred procedure involves mixing the gum base with the softener until a uniform homogenous mass is obtained, then a portion of the sweetening agent (normally one-half) is added to the heated gum base and blending is continued until a homogenous mass is prepared, preferably up to five minutes. Finally, the remaining sweetener and flavor oil are added and again blended to form a uniform composition. Finally, the mixture is allowed to remain hot and the spray-dried flavor and spray-dried menthol are added along with the remainder of the ingredients, including the colorant, if any, and other adjuvants, are added and the resulting composition is then mixed for a period of time that may range as high as thirty minutes, to form a fully uniform composition. The mass is then removed from the mixer and is allowed to cool further and may thereafter be formed into various final shapes by known gum manufacturing techniques. For example, the mass may be rolled in contact with a conventional dusting medium, such as calcium carbonate, mannitol, talc and others.

The gum composition of the present invention may be prepared into all the various end forms known commercially, including slab form, stick form, cube form and center-filled form. Sugar and sugarless chewing gums are contemplated within the scope of this invention. All of the techniques associated with the preparation of the products in these forms are well known and the present method may vary somewhat depending upon the specific end product to be manufactured without departing from the essential parameters relating to the exclusion of water. Such other details are presented for purposes of illustration, and to provide a best mode for the practice of the invention, and therefore the invention should not be limited to those parameters.

A preferred process of preparing a chewing gum composition which when chewed gives the user the perception of breath-freshening involves: (a) admixing a chewing gum base at a temperature from about 60° C. to about 90° C. with a softener to obtain a homogenous pliable mixture; (b) while mixing add to the monogenous pliable mixture a sweetening agent and a mint flavor oil in the amount of 0.2% to about 2% by weight; (c) add the spray-dried mint flavor and the spray-dried menthol as well as the remaining chewing gum ingredients and mix until a uniform mass is obtained; and (d) thereafter form the mixture into suitable chewing gum shapes.

The following examples serve to provide further appreciation of the invention but are not meant in any way to restrict the effective scope of the invention. All percentages throughout the specification are by weight % of the final chewing gum composition unless otherwise indicated.

EXAMPLES

Chewing gum compositions were prepared using the flavor compositions of Tables I, II & III in conjunction with the following formula:

| Ingredient | % by Weight |
|---|---|
| Gum Base | 21.00 |
| Softener | 0.2 |
| Bulking Agent (Corn syrup or sorbo solution) | 16.5 |
| Sweetener (Sugar) | 60.35 |
| Humectant | 0.45 |

SENSORY EVALUATION STUDIES - BREATH-FRESHENING

The main objective of the sensory evaluation studies was to assess the perceived breath-freshening of the inventive compositions as compared with commercially available mint gums and prior art compositions. Those flavor compositions designated with a "p" before the number are conventional prior art compositions, i.e., compositions which do not contain all three required components of the flavor composition.

TABLE I

FLAVOR COMPOSITIONS % BY WT
P# = Prior Art
I# = Inventive Composition

| INGREDIENT | P-1 | P-2 | P-3 | P-4 | P-5 | P-6 | P-7 | P-8 | P-9 (C) | P-10 |
|---|---|---|---|---|---|---|---|---|---|---|
| Liquid Flavor | | | | | | | | | | |
| Peppermint (a) | 0.8 | 0.9 | — | — | — | — | — | — | 0.5 | — |
| Spearmint (b) | — | — | 0.9 | 0.9 | 0.9 | 0.9 | 1.0 | 1.0 | — | 0.5 |
| Menthol Crystals | — | — | — | — | — | — | — | — | — | — |
| Spray-dried Flavor | | | | | | | | | | |
| Peppermint | 0.6 | — | — | — | — | — | — | — | — | — |
| Spearmint | — | — | 0.5 | — | — | — | 0.5 | 0.5 | — | — |
| Spray-dried Menthol | — | 0.5 | — | — | — | — | — | — | — | — |
| Additional Encapsulated Flavor | — | 0.2 | — | — | — | 0.2 | — | — | — | — |
| Comments Perceived Breath Freshening (B.F.) | none | high but bitter taste | none | none | none | menthol taste overpowering and bitter taste | none | none | none | none |

(a) Contains naturally occurring menthol
(b) Menthol crystals added to spearmint flavors
(c) P-9 and P-10 are representative of the flavor ingredients analyzed in a commercially available non-stick chewing gum available in peppermint and spearmint flavors. The peppermint was found to have a menthol content of about 50%. The spearmint was found to contain a 75/25 ratio of spearmint and peppermint.

TABLE II

FLAVOR COMPOSITIONS % BY WT
P# = Prior Art
I# = Inventive Composition

| INGREDIENT | I-1 | I-2 | I-3 | I-4 | I-5 | I-6 | I-7 | I-8 | I-9 | I-10 | I-11 | I-12 |
|---|---|---|---|---|---|---|---|---|---|---|---|---|
| Liquid Flavor | | | | | | | | | | | | |
| Peppermint (a) | 0.9 | 0.9 | 0.9 | 0.9 | 0.9 | 0.9 | 0.9 | 0.9 | — | 0.74 | 0.92 | 0.85 |
| Spearmint (b) | — | — | — | — | — | — | — | — | 0.9 | — | — | — |
| Menthol Crystals | — | — | — | — | — | — | — | — | 0.2 | 0.25 | — | — |
| Spray-dried Flavor | | | | | | | | | | | | |
| Peppermint | 0.6 | 0.4 | 0.2 | 0.2 | 0.25 | 0.6 | 0.2 | 0.5 | — | 0.4 | 0.5 | 0.4 |
| Spearmint | 0.5 | 0.75 | 0.75 | 0.75 | 0.4 | 0.75 | 0.75 | 0.5 | 0.5 | — | — | — |
| Spray-dried Menthol | 0.5 | 0.75 | 0.75 | 0.75 | 0.4 | 0.75 | 0.75 | 0.5 | 0.2 | 0.1 | 0.5 | 0.25 |
| Additional Encapsulated Flavor | — | — | — | 0.2 | — | — | 0.1 | — | — | — | — | — |

TABLE II-continued
FLAVOR COMPOSITIONS % BY WT
P# = Prior Art
I# = Inventive Composition

| Comments Perceived Breath Freshening (B.F.) | mild B.F. and cooling effect | mild B.F. and cooling effect | good B.F. | very high B.F. but bitter | very high B.F. with cooling effect | good B.F. but bitter | good B.F. but bitter | Excellent B.F. with cooling effect | — | | | | |
|---|---|---|---|---|---|---|---|---|---|---|---|---|---|
| INGREDIENT | I-13 | I-14 | I-15 | I-16 | I-17 | I-18 | I-19 | I-20 | I-21 | I-22 | I-23 | I-24 | I-25 | I-26 | I-27 |
| Liquid Flavor | | | | | | | | | | | | | | | |
| Peppermint (a) | 0.74 | 0.92 | 0.9 | 0.9 | — | — | — | — | — | — | 0.875 | 0.875 | .805 | — | — |
| Spearmint (b) | — | — | — | — | 0.5 | 0.6 | 0.66 | 0.5 | 0.53 | 0.6 | — | — | — | 0.66 | 0.66 |
| Menthol Crystals | 0.1 | — | — | — | 0.3 | 0.3 | 0.34 | 0.27 | 0.27 | 0.3 | 0.125 | 0.125 | .365 | 0.340 | 0.34 |
| Spray-dried Flavor | | | | | | | | | | | | | | | |
| Peppermint | 0.4 | 0.5 | 0.6 | 0.6 | — | — | — | — | — | — | 0.5 | 0.5 | 0.2 | — | — |
| Spearmint | — | — | — | — | 0.5 | 0.5 | 0.5 | 0.5 | 0.5 | 0.5 | — | — | — | 2.0 | 2.0 |
| Spray-dried Menthol | 0.25 | 0.5 | 0.75 | 0.25 | 0.2 | 0.2 | 0.2 | 0.2 | 0.2 | 0.2 | 0.25 | 0.25 | 0.115 | 0.25 | 0.25 |

(a) Contains naturally occurring menthol
(b) Menthol crystals added to spearmint flavors

STUDY ONE

The purpose of this study was to demonstrate that the inventive compositions have an effect on the intensity of the perceived breath-freshening and that the three-components are critical to this result.

Consumers who were representative of a user population (488 total), i.e., those who were predisposed to peppermint and spearmint flavored gum and had chewed these types of gum within the last 30 days, were presented with a 125 millimeter bipolar rating scale. One end of the scale (zero) was labelled "Very Little Breath-Freshening" and the other end of the scale was labelled "Very Much Breath-Freshening." Participants were given 1 stick of blind-wrapped gum, were told to chew the gum for 5 minutes and to indicate the degree of breath-freshening they perceived by marking the scale appropriately. The distance (millimeters) between zero ("0") and the consumers' mark on the scale was used as the rating score.

The results of this test were analyzed using principles of inferential statistics. Until a perceived breath-freshening effect was actually found, no effect was assumed. Thus, an assumption was made that all chewing gum produces equal perceived breath-freshening and that ratings by consumers for this breath-freshening perception would fall randomly around a given average. This assumption is called a null hypothesis. When a particular experimental variable e.g., a composition modification, produces ratings which have averages which are different enough from each other that they are unlikely to have occurred by chance, the null hypotheses is then reasonably rejected and the variable is accepted as having an actual effect in the ratings.

The null hypothesis for this experiment was that all chewing gum compositions produced equal perceived breath-freshening and therefore equal ratings on the intensity scale. The inventive spearmint gums I-17 to I-19 inclusive elicited significantly statistically higher rating scores, indicating a significantly greater intensity of perceived breath-freshening. Statistically there is less than a 5 in 100 likelihood of these results occurring by chance alone.

It is apparent then, that the requirement of all three flavor composition components is critical to the perception of perceived breath-freshening intensity as judged by consumers, who as a matter of preference are habitual peppermint or spearmint gum chewers.

AVERAGE BREATH-FRESHENING INTENSITY RATINGS OF SPEARMINT AND PEPPERMINT GUMS
(Higher Ratings indicate More Breath-Freshening)

| | No. Respondents | Rating |
|---|---|---|
| I 17 | 58 | 88.8* |
| I 18 | 58 | 91.7* |
| I 19 | 58 | 86.4* |
| P-9 and P-10** | 58 | 55.8 |
| P 7 | 59 | 62.2 |

*Significantly more perceived breath-freshening, i.e., the probability of these results happening by pure chance is less than 0.05.
**Commercially available FREEDENT, trademark of Wm. Wrigley Co.

STUDY TWO

Thirty-one expert gum panelists participated in this study to determine the perceived intensity of breath-freshening. Intensity was rated on a 9 point scale (1=no breath-freshening; 9=high breath-freshening) at chew-time intervals of 0.5 minutes, 2 minutes, 7 minutes and 15 minutes. Data for each time point was averaged and compared across the different test products. The null hypothesis of Example I was used as the basis for the test. Differences in ratings which had less than a 5 in 100 probability of occurring by chance were considered significantly different from each other.

All inventive sugarless peppermint and spearmint flavors were perceived as having higher breath-freshening than those of the prior art. The computer generated table showing these results is depicted below.

| | Intensity Rating - 9.0 Scale - Breath-Freshening | | | | | | | |
|---|---|---|---|---|---|---|---|---|
| CHEW TIME Minutes | COMMERCIAL | | | INVENTIVE PEPPERMINT | | | INVENTIVE SPEARMINT | |
| | P-9 Ppmt | P-10 Spmt | P8 Spmt | I23 | I24 | I25 | I26 | I27 |
| 0.5 | 5.41 | 4.66 | 5.03 | +6.24 | 5.59 | 5.79 | +6.03 | +6.07 |
| 2.0 | 4.62 | 3.79 | +4.48 | +5.21 | 4.93 | 4.89 | +4.83 | +5.34 |

| | Intensity Rating - 9.0 Scale - Breath-Freshening | | | | | | | |
|---|---|---|---|---|---|---|---|---|
| CHEW | COMMERCIAL | | | INVENTIVE PEPPERMINT | | | INVENTIVE SPEARMINT | |
| TIME | P-9 | P-10 | P8 | | | | | |
| Minutes | Ppmt | Spmt | Spmt | I23 | I24 | I25 | I26 | I27 |
| 7.0 | 3.21 | 2.59 | +3.24 | +4.14 | +4.24 | +4.25 | +3.76 | +4.03 |
| 15.0 | 2.48 | 1.93 | 2.25 | +3.34 | +3.31 | +3.11 | +2.76 | +2.89 |

It is clear from the above table that chewing gums made with the inventive flavor compositions showed significantly higher ratings for breath-freshening over the commercially available mint chewing gums and scored significantly higher than the prior art composition, P8, which did not contain spray-dried menthol as a component. Ratings for the inventive flavor composition were also significantly higher than the commercially available gums P-9 and

DESCRIPTION OF FIGURES

Comparative sensory evaluation tests were conducted using 40 subjects for each gum. The subjects chewed for intervals of 0.5, 2, 7 and 15 minutes and were asked to rate breath-freshening perception at each of these intervals. The results of these ratings are graphed in FIGS. 1 (Peppermint) and 2 (Spearmint).

Both figures show points at 0.5 minutes, 7 minutes and 15 minutes. Intensity of breath-freshening is shown on a scale with 3.75 being the lowest and 6.75 being the highest.

It is apparent from the graphs in both FIGS. 1 and 2 that inventive formula I-5 was perceived as giving higher breath-freshening than the commercially available P-9 and P-10 gum (which contained only flavor oil), as well as the prior art gum P-1, which lacked spray-dried methol. It should be noted that the highest score in FIG. 1 was obtained by P-2 for breath-freshening, but the overall flavor was unacceptable due to intense accompanying bitterness. FIG. 2 shows I-2 as scoring significantly higher than P-3, P-6, P-7 and P-9.

The invention being thus described, it will be obvious that the same may be varied in may ways. Such variations are not to be regarded as a departure from the spirit and scope of the invention and all such modifications are intended to be included within the scope of the following claims.

We claim:

1. A mint-flavored chewing gum composition capable of providing improved breath-freshening perception without bitterness comprising a gum base, a sweetener and a flavor composition comprising a blend of
   (a) a liquid flavor oil selected from the group consisting of spearmint oil, peppermint oil and mixtures thereof, wherein the flavor oil has a menthol content of about 15% to about 45% by weight of said flavor oil;
   (b) a spray-dried flavor oil selected from the group consisting of peppermint oil, spearmint oil and mixtures thereof; and
   (c) spray-dried menthol present in amounts of about 0.2% to about 1.0% by weight of the total chewing gum composition; wherein said flavor composition is present in amounts of about 0.6 to about 5% by weight if the total chewing gum composition.

2. The chewing composition of claim 1 wherein the spray dried flavor oil of component (b) is present in amounts of about 0.2% to about 2.0% by weight of the total chewing gum composition.

3. The chewing gum composition of claim 1 wherein the liquid flavor oil is present in amounts of about 0.2% to about 2% by weight of the total chewing gum composition.

4. The chewing gum composition of claim 1 wherein the gum base is selected from the group consisting of natural or synthetic elastomers.

5. The chewing gum composition of claim 1 wherein the sweetener is a natural or synthetic compound.

6. The chewing gum composition of claim 1 containing one or more of the additional components selected from the group consisting of additional agents, fillers, plasticizers, softeners, coloring agents, and mixtures thereof.

7. A mint flavored confectionery composition capable of providing improved breath freshening perception comprising a confectionery matrix, a sweetener and a flavor composition comprising
   (a) a liquid flavor oil selected from the group consisting of spearmint oil, peppermint oil and mixtures thereof, wherein the flavor oil has a menthol content of about 27% to about 36% by weight of said flavor oil;
   (b) a spray-dried flavor oil selected from the group consisting of peppermint oil, spearmint oil and mixtures thereof; and
   (c) spray-dried menthol present in amounts of about 0.2% to about 0.75% by weight of the total confectionery composition.

8. A mint flavored composition comprising:
   (a) a liquid flavor oil selected from the group consisting of spearmint oil, peppermint oil and mixtures thereof, wherein the flavor oil has a menthol content of about 27% to about 36% by weight of said flavor oil;
   (b) a spray-dried flavor oil selected from the group consisting of peppermint oil, spearmint oil and mixtures thereof; and
   (c) spray-dried menthol present in amounts of about 0.2% to about 0.75% by weight of the total confectionery composition.

9. A process of preparing a mint flavored chewing gum composition capable of imparting breath freshening perception comprising:
   (a) admixing a chewing gum base at a temperature of about 70° C. to about 120° C. with a softener to obtain a homogenous pliable mixture;
   (b) continuing to mix while adding a sweetening agent and a flavor oil selected from the group consisting of spearmint oil, peppermint oil and mixtures thereof, wherein the flavor oil has a menthol content of about 15% to about 45% by weight of said flavor oil;
   (c) adding a spray-dried flavor selected from the group consisting of peppermint, spearmint and mixtures thereof and spray dried menthol;
   (d) adding the remaining chewing gum ingredients and mixing until a uniform mass is obtained; and
   (e) thereafter forming the mixture into suitable chewing gum shapes.

* * * * *